US010929797B1

(12) United States Patent
Gupta et al.

(10) Patent No.: US 10,929,797 B1
(45) Date of Patent: Feb. 23, 2021

(54) FAULT TOLERANCE DETERMINATIONS FOR NETWORKED RESOURCES (71) Applicant: Amazon Technologies, Inc., Reno, NV (US)

(72) Inventors: Diwakar Gupta, Seattle, WA (US); Georgios Elissaios, Seattle, WA (US); Joshua Dawie Mentz, Cape Town (SA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1061 days.

(21) Appl. No.: 14/863,340

(22) Filed: Sep. 23, 2015

(51) Int. Cl.
*G06Q 10/06* (2012.01)
*G06F 9/455* (2018.01)
*H04L 12/911* (2013.01)

(52) U.S. Cl.
CPC ..... *G06Q 10/0635* (2013.01); *G06F 9/45558* (2013.01); *H04L 47/821* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 9,438,529 B1* | 9/2016 | Kowalski | G06F 9/45558 |
| 2010/0031253 A1* | 2/2010 | Adams | G06F 9/455 |
| | | | 718/1 |
| 2012/0265976 A1* | 10/2012 | Spiers | H04L 63/0218 |
| | | | 713/2 |
| 2013/0054788 A1* | 2/2013 | Corddry | H04L 43/0817 |
| | | | 709/224 |
| 2013/0097120 A1* | 4/2013 | Mummidi | G06F 16/21 |
| | | | 707/649 |
| 2013/0174145 A1* | 7/2013 | Chen | G06F 9/5094 |
| | | | 718/1 |

(Continued)

OTHER PUBLICATIONS

Nandi, Bipin & Paul, Himadri & Banerjee, Ansuman & C. Ghosh, Sasthi. (2013). Fault Tolerance as a Service. IEEE International Conference on Cloud Computing, CLOUD. 10.1109/CLOUD.2013. 75.*

(Continued)

*Primary Examiner* — Eric W Stamber
*Assistant Examiner* — George H Walker, III
(74) *Attorney, Agent, or Firm* — Hogan Lovells US LLP (57) ABSTRACT

A customer having a deployment of resources in a resource provider environment can utilize a mechanism such as an application programming interface (API) to obtain fault, risk, and/or distribution information for the deployment. A risk score can be generated, by the customer or a component of the resource provider environment, that gives the customer a measure of the risk of the current deployment, whereby the customer can request one or more changes to the customer deployment. In some embodiments the customer can provide one or more risk criteria, such as a maximum risk score or minimum fault tolerance, that the resource provider environment can attempt to satisfy over the duration of the customer deployment, automatically making adjustments to the deployment as appropriate. The risk score can include information about the customer workload as well as the physical deployment in order to provide more accurate data.

17 Claims, 7 Drawing Sheets

(56) References Cited

U.S. PATENT DOCUMENTS

| | | | | |
|---|---|---|---|---|
| 2013/0204990 A1* | 8/2013 | Skjolsvold | ............ | G06F 9/5077 |
| | | | | 709/223 |
| 2014/0164612 A1* | 6/2014 | Hillier | ................. | H04L 41/0896 |
| | | | | 709/224 |
| 2015/0115711 A1* | 4/2015 | Kouroussis | ............. | H02J 9/061 |
| | | | | 307/23 |
| 2015/0248315 A1* | 9/2015 | Ragupathi | ........... | H04L 41/0806 |
| | | | | 709/226 |
| 2015/0319160 A1* | 11/2015 | Ferguson | .............. | H04L 9/0894 |
| | | | | 726/10 |
| 2016/0103728 A1* | 4/2016 | Shetty | ................. | H04L 41/0659 |
| | | | | 714/57 |
| 2016/0378530 A1* | 12/2016 | Ramasubramanian | ...................... | |
| | | | | G06F 9/45558 |
| | | | | 718/1 |
| 2017/0083457 A1* | 3/2017 | Khemani | ............ | G06F 12/1408 |

OTHER PUBLICATIONS

Irimie B-C, Petcu D (2015) Scalable and fault tolerant monitoring of security parameters in the cloud In: 2015 17th International Symposium on Symbolic and Numeric Algorithms for Scientific Computing (SYNASC), 289-295.. IEEE, Los Alamitos. DOI: 10.1109/SYNASC.2015.53.*

* cited by examiner

FAULT TOLERANCE DETERMINATIONS FOR NETWORKED RESOURCES

BACKGROUND

As an increasing number of applications and services are being made available over networks such as the Internet, an increasing number of content and service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed. Because the resources are generally provided in locations over which a customer does not have visibility or direct control, the customer will generally not be able to determine the fault tolerance of the resources. For example, the customer might only have minimal ability to control how and where resources are provided, such as over a determined number of geographic locations, even though the placement and selection of physical resources can impact the fault tolerance of the services provided to the customer.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing the deployment of resources in an electronic environment. In particular, various embodiments provide a mechanism, such as an application programming interface (API), that enables a customer to request information about the risk or fault tolerance of a customer deployment in a resource provider environment or other such system, service, or offering.

In some embodiments, a customer of a resource provider can submit a request for fault, risk, and/or placement information through such an API. A system, service, or component of the resource provider environment can determine aspects of the deployment of various physical and/or virtual resources (i.e., computing and data resources) allocated to the customer, as well as various fault boundaries, shared components, and other aspects that can affect the risk of the deployment. Information about the deployment and/or risk can be determined and provided to the customer. In some embodiments the customer will receive deployment information that the customer can use to determine the risk or fault tolerance of the customer deployment. In other embodiments the resource provider environment can use the deployment information to calculate a value such as a risk score or fault tolerance that can be provided to the customer. This can include a total risk score, as well as a static and/or dynamic risk score in some embodiments, where the static risk relates to the deployment itself and the dynamic risk relates to factors such as the customer workload. The customer can use a separate mechanism, such as a placement API, to request a redeployment, redistribution, or other such change to at least a portion of the customer deployment in response to the fault tolerance or risk data. The customer can also use the data to relatively easily create a similar deployment if the customer is satisfied with the fault tolerance and risk data provided.

In some embodiments the customer can provide one or more risk criteria that are to be used to determine the customer deployment. The customer can also specify a set of techniques that are permissible, or not permissible, to use in adjusting the deployment. This can include a level or amount of pricing that the customer is willing to accept. In some embodiments the resource provider environment can also be tasked with satisfying the risk criteria over the duration of the deployment. These can include placement-specific criteria, such as a maximum number of resources in a common fault zone or sharing a common fault point, such as a top of rack switch or power supply. These criteria can also include one or more risk of fault criteria, as may be based upon a calculated risk score or other such value. Various sources of risk can be considered, and the risk values of each of those sources combined to generate an overall risk score that can be provided to the customer and/or used to ensure that the deployment satisfies the risk criteria. The resource provider environment can automatically make changes to the customer deployment in order to ensure that the deployment satisfies the criteria based on a current value of the risk score or other such value(s).

Various other applications, processes, and uses are presented below with respect to the various embodiments.

Figure 1A:
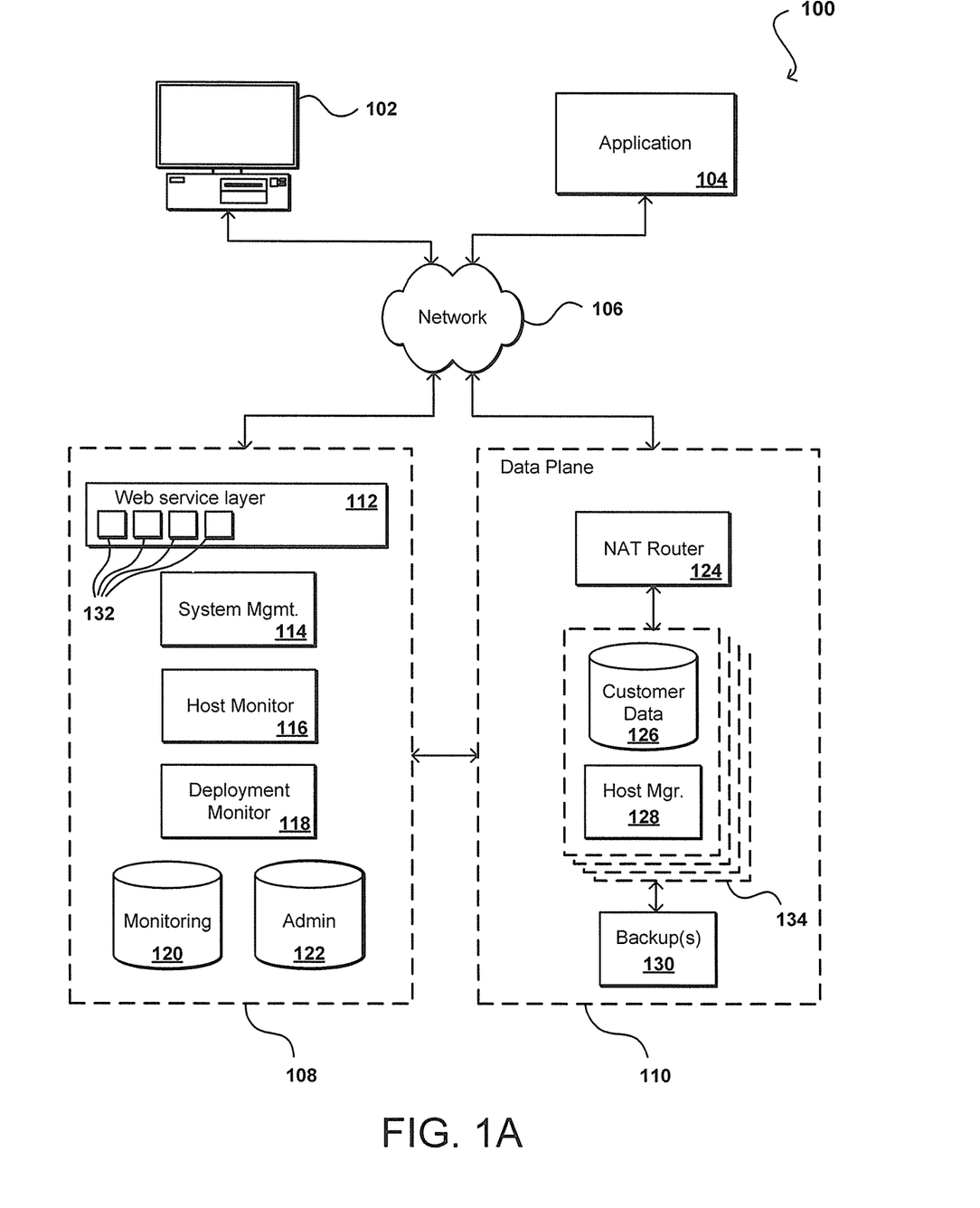
FIGS. 1A and 1B illustrate an example environment in which various embodiments can be implemented.

FIG. 1A illustrates an example operating environment associated with a service provider in accordance with various environments, which an emphasis on describing an example control plane. As described, functionality at least a portion of a user's operating environment can be migrated to the operating environment associated with a service provider, such as service provider environment 100 in FIG. 1A. The environment can be a multi-tenant environment, for example, wherein multiple customers are able to share the resources of the environment. This can include customers having dedicated resources, having dedicated portions of shared resources (i.e., shared storage on one or more data stores or data servers), or sharing available capacity on various resources, among other such options. Accordingly, the user can be provided access to resources appropriate to operate the user's enterprise computing needs. This can include, for example, enabling access to resources that provide functionality corresponding to all or a portion of the user's operating environment. For example, in the situation where a user's operating environment includes a health care environment that includes a web front-end, the user can extend at least the web front-end into an environment associated with a service provider, where the service provider provides the resources (e.g., hardware and software) for the user to manage the web front-end. In this example, the resources provided by the service provider can be used to perform tasks such as authenticating users of the health care environment based on credentials, authorizing the users of the health care environment, throttling requests to servers of the health care environment, validating inputs, and marshalling or unmarshalling requests and responses. It should be noted that although this example is directed towards the functionality associated with a web front-end, the user can migrate and manage functionality of other resources of the user's health care environment in the service provider's environment.

For example, a computing device 102 for an end user or customer can make calls through at least one network 106 (e.g., the Internet, a cellular network, a wireless network, a local area network (LAN), etc.) into a control plane 108 to perforin a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

As described, leveraging a service provider's environment can advantageously provide a customer with increased reliability and fault tolerance. For example, the control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository.

In accordance with various embodiments, the host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

Once an instance is provisioned and a user is provided with a DNS address or other address or location, the user can send requests "directly" to the data plane 110 through the network using a Java Database Connectivity (JDBC) or other such client to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108.

A host monitoring component 116 can access the information in the monitoring data store to determine active VMs, resource instances, or other such resources or components in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

Figure 1B:
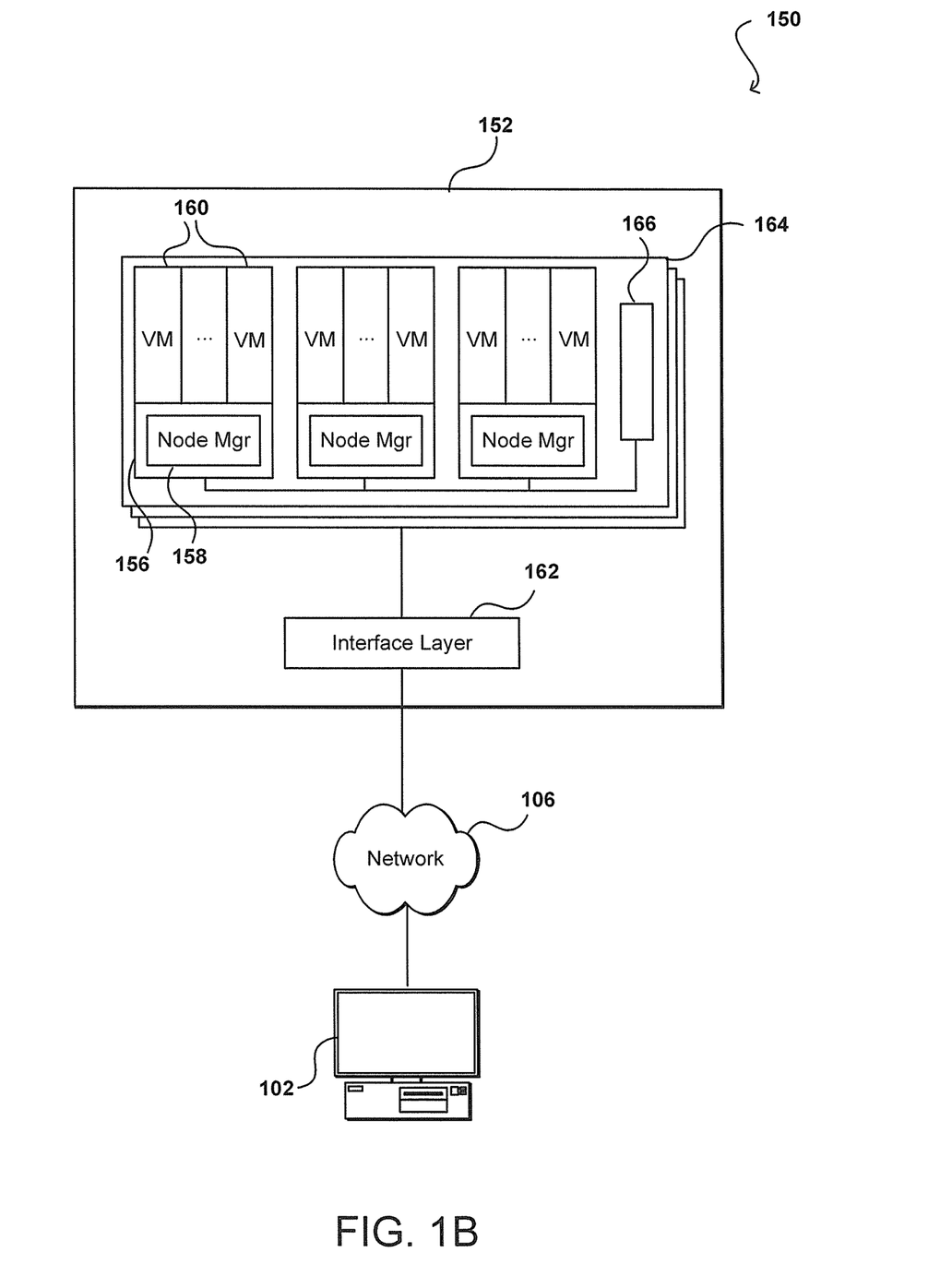

FIG. 1B illustrates a second view 150 of the example environment 100 in which aspects of the various embodiments can be implemented. In this example, a user is able to utilize the computing device 102 to submit a call or request to a shared resource environment 152. The resource environment 152 in this example includes an interface layer 162, as may include components such as application programming interfaces (APIs), routers, switches, Web servers, and other such components known or used for routing communications from a user computing device 102 to an appropriate resource in the environment. In this example, the resource environment 152 includes a number of racks 164, each rack including a number of host computing devices 156, as well as an optional rack support computing system 166 in this example embodiment. The host computing systems 156 on one of the illustrated racks 164 each host one or more virtual machines 160 in this example, as well as a distinct virtual machine manager 158 associated with the virtual machines on that host computing system. The virtual machine manager (VMM) is tasked with managing the virtual machines (VMs) on the respective host device, and handling various aspects of virtualization. Each virtual machine 160 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 152. Each computing system may also have one or more local attached storage devices (not shown), such as to store local copies of programs and/or data created by or otherwise used by the executing programs, as well as various other components.

It will be appreciated that the examples of FIGS. 1A and 1B have been simplified for the purposes of explanation, and that the number and organization of host computing systems and other devices may be much larger than what is depicted. For example, as one illustrative embodiment, there may be approximately tens of thousands of computing systems in a cloud environment, with at least some of those computing systems being host computing systems that may each host multiple virtual machines.

Although the data plane 110 is shown as a single environment, it should be understood that resources of the data plane can be located in a number of different environments, whether different logically and/or physically. For example, in the example situation 200 of FIG. 2, the instances 204 for a given customer are shown to be able to be spread or otherwise provisioned across multiple data plane zones 202, 210, 220. As described, the instances 204 (e.g., data instance or virtual machine) can include at least one data store 206 and a host manager component 208 for the machine providing access to the data store.

Figure 2:
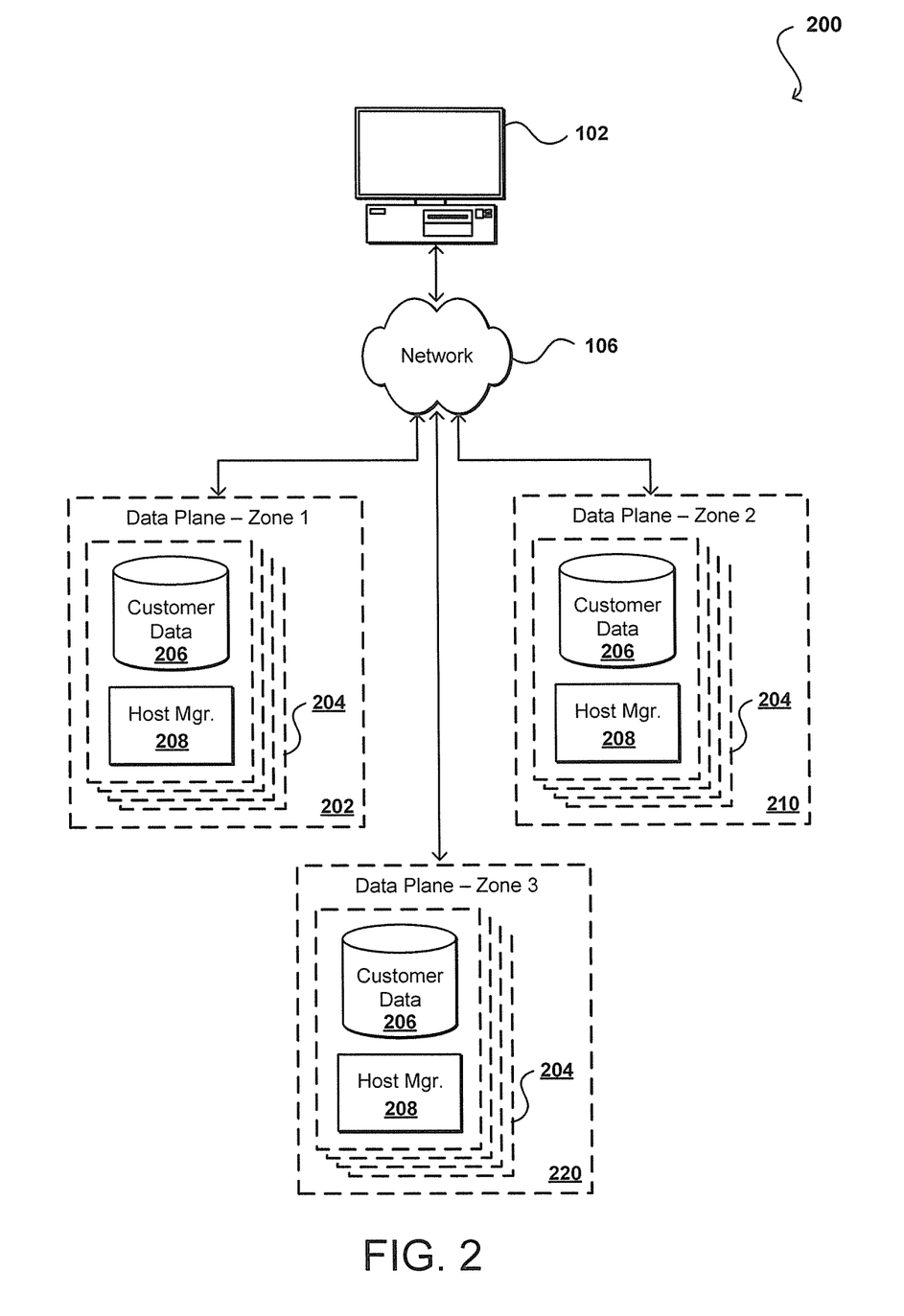
FIG. 2 illustrates an example environment in which resources for a customer are distributed across a number of zones that can be utilized in accordance with various environments.

In accordance with various embodiments, the zones (or environments, regions, etc.) can be separated using any logical and/or physical separation or partition appropriate for such purposes. As an example, these zones might correspond to different geographical locations, such that a disaster or other event causing unavailability in one geographical location will be less likely to impact the resources in other geographical regions. Such regional separations are often used for redundancy and fault tolerance, such that the data, applications, and resources needed by the customers of the resource provider can be provided from at least one of the availability zones in the event of an outage in a different zone. The zones also might correspond to logically separated zones, such as where the resources might be in the same data center but separated into different logical zones such that a logical error or other event in one zone will not impact another logical zone. The resources in such an example could include servers in the same rack or even different instances in the same server. In other embodiments the zones might be in the same data center, for example, but provided using different hardware such that the failure of a physical component such as a switch or power supply will only affect one of the zones and the functionality will continue to be available to the customer from the other zone. Such logical and/or physical separation between zones provides a set of what are referred to herein as fault boundaries, where a fault (of at least a specified type or set of types) on one side of the boundary will not directly impact the resources on the other side of the fault boundary. There may be indirect impacts, however, such as an increase in traffic or load on one side of the boundary resulting from a failure on the other side of the boundary that caused tasks to be routed from the failed side of the fault boundary.

Figure 3:
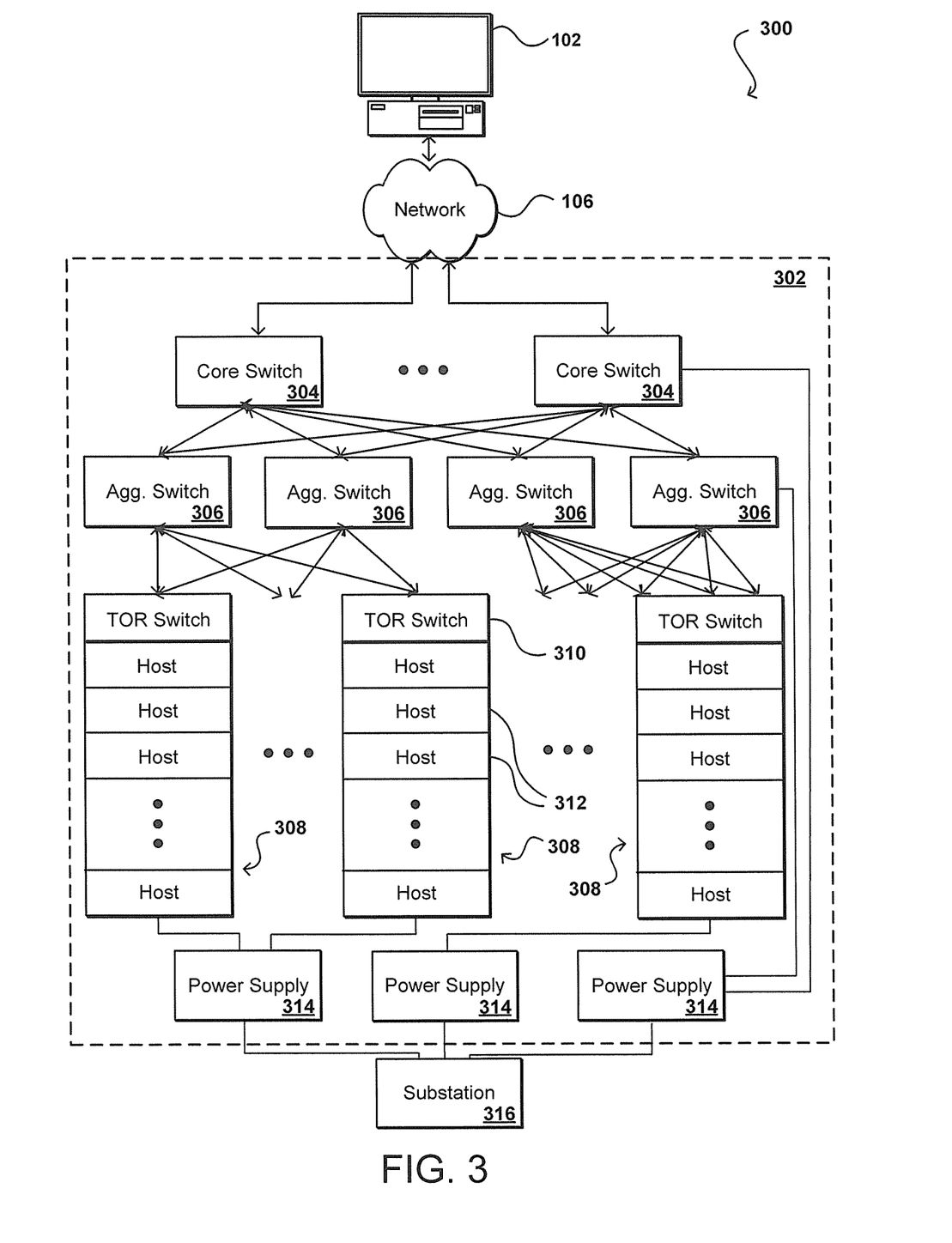
FIG. 3 illustrates an example configuration of resources in a resource zone or environment that can be utilized in accordance with various embodiments.

FIG. 3 illustrates an example configuration 300 that represents a traditional hierarchical network design that can be used to route requests to specific host machines or other such devices in such an environment, in order to provide users or applications with access to a variety of distributed resources. This example shows a typical design that can be used for a data center, wherein a source such as an end user device 102 is able to send requests across at least network 106, such as the Internet, to be received by one or more components of the data center. It should be noted that reference numbers for similar components are carried over between figures for simplicity of explanation, but such usage should not be interpreted as a limitation on the scope of the various embodiments unless otherwise explicitly stated. Properties of various components of the network, such as provisioned instances, etc., can be managed using at least one management system, component, or service. In this example, the requests are received over the network to one of a plurality of core switches 304 of a data center zone 302, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 304 is able to communicate with each of a plurality of aggregation switches 306, which in at least some embodiments are utilized in pairs. Utilizing aggregation switches in pairs provides a redundant capability in case one of the switches experiences a failure or is otherwise unavailable, such that the other device can route traffic for the connected devices. Each pair of aggregation switches is linked to a plurality of physical racks 308, each of which typically contains a top of rack (TOR) or "access" switch 310 and a plurality of physical host machines 312, such as data servers, application servers, and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred-twenty racks, based on factors such as capacity and number of ports. There can be any appropriate number of aggregation switches in a data center, such as six aggregation pairs. The traffic from the aggregation pairs can be aggregated by the core switches, which can pass the traffic "up and out" of the data center, such as back across the at least one network 106. In some embodiments, the core switches are provided in pairs as well, for purposes including redundancy. As discussed herein, the separation of core switches and aggregation switch pairs can be said to form fault boundaries for purposes of customer instances and instance placements and distributions. In some embodiment a customer may be able to define which fault boundaries to be used for their deployment.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" rack (a sub-rack of a physical rack or logical grouping of devices (hosts and/or switches) from multiple racks), with each local TOR switch connecting twelve host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments. As with the core and aggregation layers switches, the TOR switches can also serve as failure points and there can be fault boundaries defined between the various TOR switches.

Also as illustrated in FIG. 3, there can be various power supplies 314 used to power the various physical components. These may be uninterruptable power supplies, for example, that are able to provide emergency power when the input power source, such as a power main or substation, fails. A power supply can provide emergency power for a period of time proportional to the amount of energy stored by the power supply. Accordingly, separation between power supplies can act as fault boundaries. Similarly, the power supplies will generally be supplied to a power source such as a substation 316, for example. Each geographic region, data center, or other physical grouping of resources can utilize a different substation in at least some embodiments, providing for additional fault boundaries. As can be seen from the figures and description, there can be multiple fault boundaries within a resource provider environment, including multiple boundaries within data centers, resource zones, and other such groupings. A provider may decide to formally select some of these boundaries as fault boundaries for reporting and placement purposes. These boundaries can also help to define groupings of resources that can help to calculate a fault tolerance score as discussed later herein.

In some embodiments, a customer has the ability to specify at least some aspect of the placement of customer instances and/or selection of resources to be used to provide services to that customer. Referring back to FIG. 1, this can take the form of a "placement" interface or other API 132 into which the customer can make a call to specify information about the placement, or placement groups, to be used for the user. In addition to allowing the user to specify specific physical resources, the API in this example can also enable a user to specify placement to occur across various fault boundaries. This can include, for example, enabling the customer to specify that the instances should be spread across at least three geographical regions, two data centers, four availability zones, etc. Some APIs may allow for a more granular placement instruction, such as no more than two customer instances in the same server rack or associated with the same TOR switch or power supply. In some embodiments a customer can interrogate the distribute API to determine information about the distribution of the customer instances, and can request a re-distribution according to specific distribution criteria.

While some conventional systems allowed for some amount of placement specification by a user, it has been difficult for a customer of a conventional service provider environment to attempt to determine the fault tolerance for the customer's instances. Since the customer typically has very little visibility into the configuration of the network environment, or the way in which the environment is separated into zones or groups, the customer can have no way of knowing how to best distribute the resources. For example, a set of servers in a single zone might have a separate power supply for each, providing a relatively low likelihood of fault due to a power failure. A pair of data zones might only have one power supply each, such that the risk due to a power failure might actually be higher for a distribution across the pair of zones than spreading across servers in the single zone.

Accordingly, approaches in accordance with various embodiments can provide an interface, such as a fault API, to enable a customer to determine a risk score, fault tolerance, or other such value(s) or information that can help the customer to determine information such as the risk or fault tolerance for the customer's instances, in order to help the customer with placement and/or re-distribution decisions. For example, a customer can submit a request to a fault API regarding the customer's current distribution, and can receive back a fault tolerance, risk score, or fault summary. As mentioned elsewhere herein, a fault summary can include information about the sources of fault or risk in in the implementation, as may be provide in an XML data structure with an entry for each such source, as well as an overall fault score or other such value(s). In some embodiments the customer will receive back a fault summary and can compute their own risk score. If the customer has not yet executed the distribution, the customer can submit a query with one or more placement criteria to obtain back a predicted fault score, based on current fault values and network configurations, to determine whether to attempt a different deployment. If the customer is able to provide information about the application or use for the deployment, the fault score can be further refined or accurately calculated in at least some embodiments. For example, a customer with an application requiring high load on physical disks may have a much different fault tolerance (or risk of failure, problem, incident, unavailability, etc.) than someone without such a load requirement. Other factors can impact the fault tolerance as well, such as the minimum amount of bandwidth needed for the application. The user can thus provide information about a type of application or use through the API.

If a customer queries the fault API and determines that the risk score, fault data, or other fault characteristic(s) does not at least meet or satisfy the client expectations or desires, for example, the customer can submit a request to the placement API to cause at least some of the instances to be re-distributed. In at least some embodiments a customer can request to have the customer instances spread across different placement groups, availability zones, deployment units, or other such groupings. The customer can also request to be spread across multiple data centers or server farms, even across a minimum number of spines, racks, or switches in at least some embodiments. The type of application can dictate the preferred distribution, as applications that are bandwidth intensive will have different fault tolerances (or at least ability to withstand different types of faults) than applications that are memory, processor, or power intensive, etc.

In at least some embodiments, the fault information provided to the customer can depend at least in part upon the way in which the provider of the resources defines the fault characteristics or fault boundaries. For example, a provider can define fault values based at least in part upon power supply distribution. For a given deployment (i.e., placement of instances across known physical resources) for a customer, it can be determined which power supplies are shared between customer instances, such that the impact of a failure of one of those power supplies (i.e., a server-specific power supply or data center power supply) on the overall customer deployment can be determined. A customer submitting a request for risk data could then receive back information that relates to the power profile and a risk factor (i.e., score, percentage, or other such value) that indicates how many of the instances share a power supply and how many are on separate power supplies. This could be provided as a score, distribution, or other such value or set of values. A provider could submit a similar query, providing information about a set or group of resources and receiving a power profile as to how power supplies (and substations or other power components or systems) are shared among, or distributed across, those resources. The information could provide back that six of twenty-four resources share power at some level (e.g., server power supply, rack power distribution unit, room power distribution unit, etc.). The returned value could also be a normalized fault score, such that all resources sharing a power supply could return a value of zero, as all the resources would be affected by the power supply being unavailable, or a value of one if each resource has a separate power supply, as a problem with a power source would not affect any resource other than the connected resource. It should be understood that different values might be used as appropriate, as any risk may be determined to have a non-zero risk value, such that each resource having a separate power supply would still have some minimum fault score, such as 0.1, etc. These type-specific risks can be extended to other types of faults as well, such as failure of a network switch, substation, server, rack switch, etc. Any aspect that could affect more than one resource can be considered for redistribution in some embodiments.

As mentioned, many of the failures in data centers today relate to TOR switch failures, which affect all physical resources located "below" the TOR switch in the hierarchical network topology. Accordingly, hierarchical fault partitions can be defined in at least some embodiments for purposes of determining fault tolerance. Customers of a small data center might be willing to accept a number of their servers under a single switch, but the customers might request that each of those servers be in a different rack or deployment underneath the switch so that the customer is are better protected from a single rack becoming unavailable or otherwise experiencing a problem that impacts the customer capacity.

Many of the fault tolerance scores and values discuss herein are static values that can be provided to any customer or entity requesting fault tolerance data for a set of resources. In at least some embodiments, however, it is desirable to calculate more dynamic values that are based at least in part upon aspects such as intended use, workload, current capacity, etc. As mentioned, different applications and used will have different fault scores based at least in part on the way in which the resources are used. Further, a data center under a heavy customer load will have a different fault tolerance than a data center with a lot of excess capacity at the current time. Thus, different fault scores can be generated for different customers, applications, uses, times of day, days of the week, and other such aspects. In some embodiments the placements can be redistributed throughout the day or week in order to minimize the risk due to faults of at least one or more specified types. The fault tolerance may be significantly higher on off-peak hours, such that a customer might also request to have at least certain operations executed during those times.

In some embodiments, fault data for various customers can be aggregated and analyzed to provide more accurate fault data. For example, fault data can be collected for various customer deployments under a variety of circumstances. This data can be analyzed using a machine learning algorithm, for example, that could analyze the various workloads and associated fault data to determine more accurate fault data for specific types of deployments, uses, applications, etc.

The fault scores themselves can be calculated in a number of different ways based on a variety of different types of fault types, fault boundary definitions, expected customer workloads, and the like. In some embodiments, the risk scores are calculated based at least in part upon shared physical attributes that each provide some contribution to the overall risk score. As mentioned, each attribute (such as shared power supply or shared TOR switch) can have some risk tolerance score, which in some embodiments can be normalized from 0 to 1. These individual scores can then be summed, averaged, or otherwise combined to generate an overall fault score. In some embodiments, there can be a weighted average (or arithmetic or geometric mean, etc.) of the individual fault scores, where the weighting can depend upon factors such as observed contribution, intended use, current workload, customer input, historical performance data, and the like. In some embodiments the risk score is a factor of binary decision values. For example, for any pair of user instances do those instances share the same power supply, TOR switch, server, rack, etc. For each potentially shared component the value can be a 0 if not shared and a 1 if shared. This can provide a very simple risk score. For more advanced scores, the level of sharing of components among various combinations of instances and complex risk patterns can be applied to calculate a more accurate risk score. For example, different devices can have different failure profiles and each shared component can be assigned a weighted value that reflects how likely it will cause a fault as compared to other shared components (e.g., a TOR switch can be assigned a larger weight than a spine switch because the TOR switch causes faults more than a spine switch). As mentioned, these can be static risk scores based on the configuration or can be dynamic scores based upon factors such as observed risk, user workload, and the like. In some embodiments the risk score can be calculated as a combination of the static risk and the dynamic risk. The risk score returned in some embodiments can instead be a determined risk function (i.e., a probability function), where the risk score depends at least in part upon the workload of the user or load on the system at a given time, among other such factors. In some embodiments even where an overall risk score is determined it can be desired to provide the static and dynamic risk scores separately. The static risk can be the most important (and basic) in terms of shared infrastructure across various customers, which can be more important to maintain and/or fix than the sources of dynamic risk in at least some embodiments.

Other factors that can be considered when calculating the risk score include the age or version of the hardware and/or software used to support the customer instances, data, and other aspects of the customer workload. Newer versions of software with security patches may be determined to be lower risk than older versions from a security or availability point of view. Similarly, newer hardware with updated firmware may be considered to be less risky than older hardware. The likelihood of a failure of a hardware component also increases with age for at least some types of components, such that the risk score for a given component may increase over time. Certain types of devices might also be more prone to failure, such as devices from a certain manufacturer, of a certain model, with certain components, etc.

Figure 4:
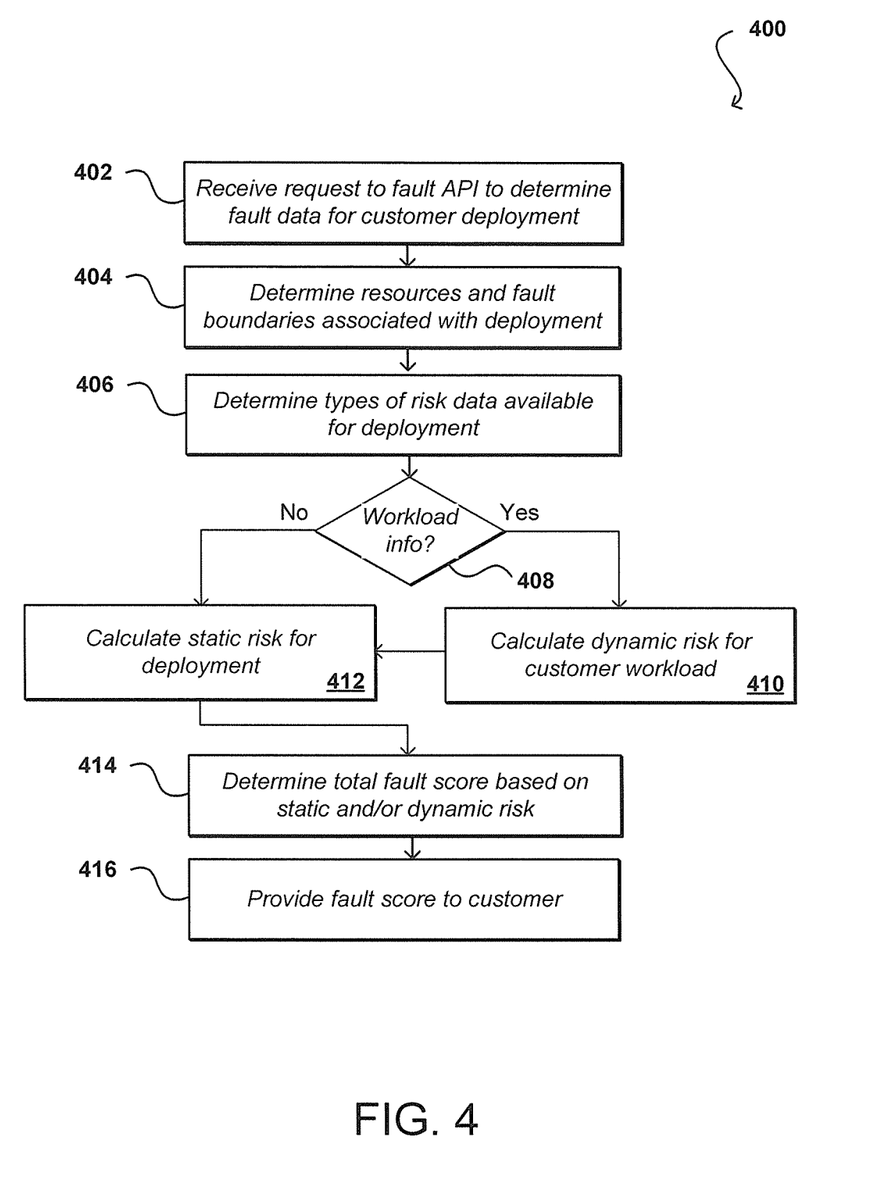
FIG. 4 illustrates an example process for determining fault tolerance for networked resources that can be utilized in accordance with various embodiments.

FIG. 4 illustrates an example process 400 for obtaining a fault score for use of a set of resources that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, a request is received 402 to a fault API or other interface of a resource provider environment. This can include, for example, a request received to an API 132 of a Web services layer 112 of a control plane that can be directed to a system management component 114 of the control plane, as illustrated in FIG. 1A. The request is associated with a customer of the resource provider and is requesting fault data relating to a customer deployment in the resource provider environment. As discussed, this can include a fault score relating to a number of physical or virtual resources allocated to the customer across one or more fault boundaries of the resource provider environment. In some embodiments an account verification, customer authentication, or other such process may be performed before acting on the request. In response to the request, a determination can be made 404 as to the resources and fault boundaries associated with the customer deployment. This can include determining the types and number of resources, as well as the location and configuration of those resources in the environment. The types of risk data available for the deployment can also be determined 406. As discussed, the types of information available can depend upon factors such as the types of resources utilized, the supporting devices (i.e., power supplies and network switches), the configuration of the environment, the age and version of the hardware and software utilized, and other such factors.

A determination can also be made 408 as to whether any workload information for the customer is available. This can include information included in the request, or information available to the resource provider environment about the historical, current, and/or anticipated workload for the customer deployment. As mentioned, such information can potentially impact the risk score as operations that cause resources to run at maximum capacity can have greater risk than operations that provide little use of those resources. Further, if the system is currently experiencing a heavy workload, the risk of a resource failing due to heat, excessive wear, or other such factors can be increased as well. Further still, if the information provides detail regarding the function of each instance then this can be taken into account when calculating fault scores, such as where all the database instances are under the same TOR and the fault profile for the service increases. In one example, a customer may provide a service architecture that describes the resources. The system could then generate risk scores for each type of resource in a deployment and use the risk scores to generate a score for the overall service. The score can change as instances are added, removed, or moved, or as instances fail, due to the dynamic nature of the deployment.

If such information is available, a value for dynamic risk can be calculated 410 for the customer workload. Whether the workload information is available or not, a value for the static risk can also be calculated 412. If sufficient data is not available for the static and/or dynamic risk values, values for similar deployments can be used to determine a projected initial risk value, and this initial risk value can be updated over time as more data is obtained for the actual deployment. A total fault score can then be determined 414 for the customer based on the static risk value and, if available, the dynamic risk value. In some embodiments the static risk and total fault score can be determined in the same step and/or as the same value if workload information or other information useful for calculating dynamic risk is not available, or if the system is configured to only consider static risk, among other such options. Once the total fault score is determined, it can be provided 416 to the customer or another appropriate recipient indicated by, or associated with, the received request.

As mentioned, an advantage to providing fault scores or fault information to a customer is that the customer can evaluate the potential risk for a current deployment and determine whether to change any aspect of the deployment, at least to the extent allowed by the resource provider. A customer wanting a redeployment or redistribution of one or more of the allocated resources, or resource instances, can submit a request to a distribute API or other such interface with information indicating the redeployment to be performed. As mentioned, the specificity in the request can depend at least in part upon the granularity to which the provider gives the customer control over a deployment. This can include, for example, specification of fault boundaries or regions across which to distribute the resources, a maximum number of resources associated with a given fault source or boundary (i.e., common power supply or switch), a maximum number of resources in a given fault zone, etc.

In some embodiments, the customer can additionally or alternatively provide fault criteria to the resource provider environment, which are to be maintained by the deployment. For example, the customer might provide a minimum fault tolerance needed by the deployment or a maximum risk score for the deployment, among other such options. In this example, a fault tolerance score is the ability for the deployment to withstand a fault without significant impact, where a higher score is likely better. A risk score is the level of risk of significant impact in the event of a fault, where a lower score is likely better. It should be understood that these and other parameters can be configured where different values and functions mean different things as discussed and suggested herein. Given such a fault or risk threshold from the user, the system can attempt to maintain the customer deployment in such a way that the fault criteria are always satisfied by the deployment in the resource provider environment, and can automatically make changes as needed to ensure that the deployment satisfies the criteria under different loads, capacities, or states, etc.

Figure 5:
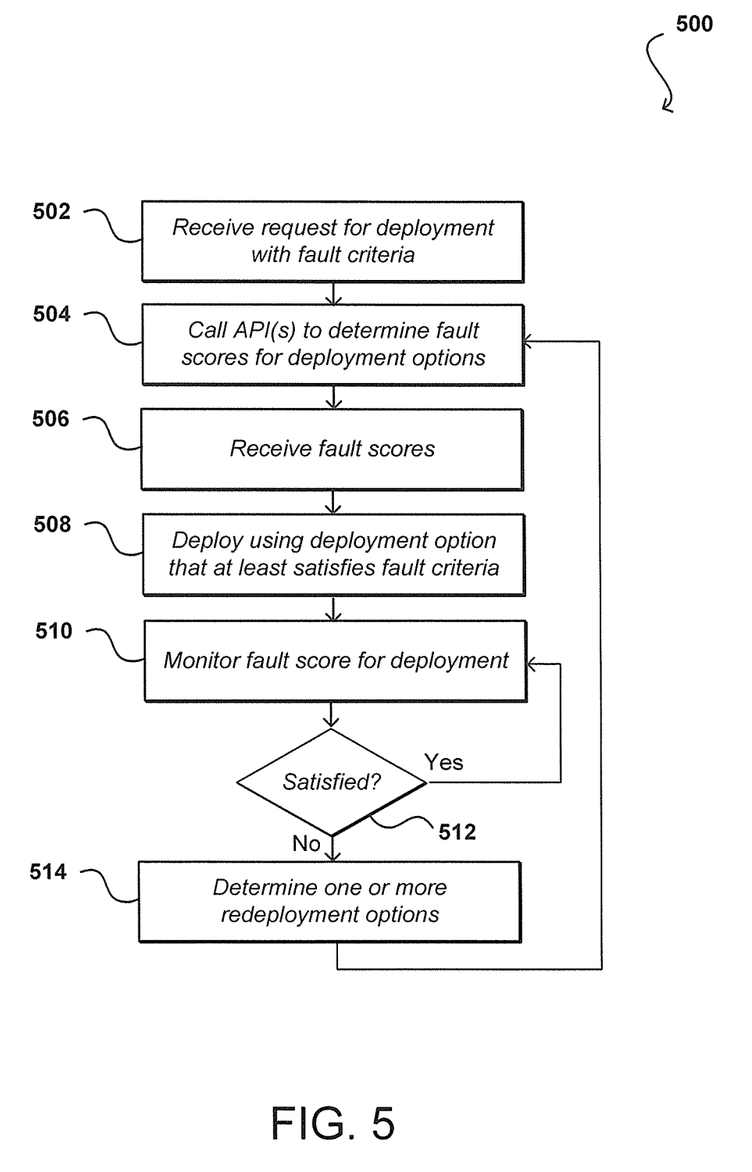
FIG. 5 illustrates an example process for causing resource placement to be executed to meet one or more fault tolerance criteria that can be utilized in accordance with various embodiments.

FIG. 5 illustrates an example process 500 for updating a customer deployment based at least in part upon user-specified fault criteria that can be utilized in accordance with various embodiments. In this example, a request is received 502 for a customer deployment, where that request specifies one or more fault criteria to be used for the deployment. As mentioned, this can include a threshold such as a maximum risk score or minimum fault tolerance, among other such options. In response to the request, one or more calls 504 can be made to one or more APIs to determine the fault scores for the various deployment options possible for the customer deployment. This can include determining available resources and then making a call for static fault scores, as well as determining customer workload data and making a call for a fault score that includes a dynamic fault aspect, among other such options. As mentioned, the fault scores provided may be based upon historical customer data and/or data from other customers with similar deployments. The fault scores can be received 506, and then one of the deployment options selected that at least satisfies the fault criteria. This can include, for example, the first option located that satisfies the fault criteria, a preferred option of the resource provider environment that satisfies the fault criteria, or an option that most satisfies the fault criteria (i.e., the option with the lowest risk), among other such options. One or more calls can then be made to cause the customer deployment to be deployed 508 according to the selected deployment option. As mentioned, the deployment can be made according to permissible techniques, as may include specific live migration actions on one or more instances, rebooting one or more instances, deploying additional instances or deleting instances, or changing the type of instances used, such as to a different instance type with a different fault characteristic. These actions can take into account any maximum deletion values, allowed types of redeployment, or other such rules or limitations on various cost parameters, etc. For example, changing the instance type or adding instances may increase fees the customer has to pay such that price may have an impact on the technique employed. Another factor is invasiveness. Rebooting and terminating instances may have a larger impact on a customer's deployment than live migration or adding more instances, but take more effort for the service environment to complete The customer deployment can be monitored 510 to determine updated fault scores. This can include, for example, periodically determining a fault score for the deployment for the current customer workload, resource state, deployment, and other such options. While in this example the deployment is monitored on behalf of the customer, in other embodiments the customer can monitor the deployment and request redeployments as desired. In other embodiments the fault score can be recalculated each time a type of change is detected or requested, such as to increase or decrease the number of instances for the customer, adjust the deployment, replace or update a resource, etc. A new score can also be calculated each time the fault criteria for the deployment changes. Updated or new risk or fault scores can be determined at other appropriate times as well within the scope of the various embodiments. A determination can be made 512 for each new fault score as to whether the fault criteria for the customer deployment are still satisfied. This can include, for example, determining whether the deployment is at risk of not satisfying the criteria or is trending toward not satisfying the criteria, among other such options. If the criteria are still satisfied, the deployment can continue to operate and the monitoring of the deployment can continue. If, however, the risk score does not satisfy the criteria, or is at risk of not satisfying the criteria, one or more redeployment or redistributing options can be determined 514, and the fault scores for these options determined such that one of these deployment options can be selected. As with the original deployment, the selected deployment option can be selected using various rules or selection mechanisms as long as the selection will satisfy, or most closely satisfy, the fault criteria. In some embodiments the option that satisfies the criteria and requires the least redeployment or redistribution can be selected, while in other embodiments specific changes that enable the deployment to satisfy the criteria but require only specific changes, or types of changes, to the environment can be selected, among other such options.

APIs in accordance with various embodiments can also enable a user to request or provide minimum fault tolerance values for different types of faults, instead of (or in addition to) an overall fault tolerance value. For example, there can be performance-based risk and there can be common infrastructure-based risk, such as risk based on resources sharing common infrastructure such as power supplies, cooling mechanisms, or aggregation hardware. Customers obtaining information about the exposure to various types of risk can use this information to determine whether the customer is satisfied with the risk or would prefer to rebalance the customer fleet. In some embodiments a customer can have the option of providing a risk profile indicating the minimum tolerance values for different types of faults, for example, whereby the placement can be selected so as to match the risk profile for the customer. In some embodiments, a customer can indicate that for the customer would like a low correlated risk profile for the customer deployment, and the resource provider environment can automatically make changes to meet the risk score criteria as well as to satisfy the risk profile, where the profile may or may not result in the optimal risk score among the deployment options. In some embodiments a customer might instead a best effort risk profile, where the resource provider environment is instructed to select the deployment option and/or update the deployment as necessary to obtain the best possible risk score, even if that risk score at some points in time falls below a desired value.

The ability to provide for more granular control and reporting of risk values can become increasingly valuable and important as entities such as enterprises increasingly request specific redundancy and fault tolerance, among other such features. There also can be different types of instances, groups of instances, backup instances, and the like, and it can be desirable to determine the fault tolerance of each of these types of instances as well. Fault profiles can potentially be applied across such large groups of instances and information reported across the various groups.

It should further be pointed out that, although many of the examples relate to the providing of information such as fault and/or placement information for a customer or a resource provider, such information could be provided as part of a service to a third party provider or other such entity. The placement information could be obtained by the service, which could then determine a fault or risk score and provide that information to the third party provider. In some embodiments the service can also have the ability to request redeployment or redistribution of some or all of the resources in the third party provider environment using processed discussed and suggested herein.

Figure 6:
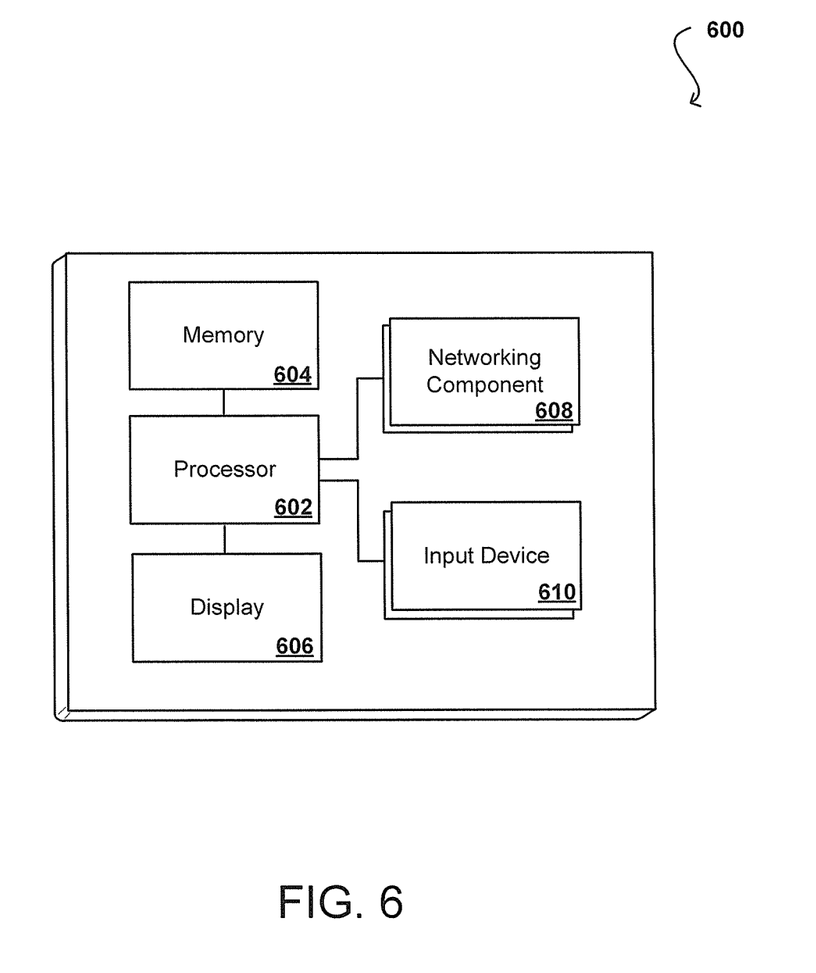
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A system, comprising:
a plurality of servers;
one or more application programming interfaces (APIs);
at least one processor; and
memory including instructions that, when executed by the at least one processor, cause the system to:
  receive, to the one or more APIs, a first request for fault information regarding a customer deployment of a set of virtual machines across the plurality of servers, the customer deployment being allocated for use by a customer having an account with a service provider that operates the plurality of servers;

determine the fault information for the customer deployment, the fault information including information about locations of servers that host the set of virtual machines and at least one shared infrastructure among the servers that host the set of virtual machines, wherein the shared infrastructure includes at least one of a power supply, a cooling mechanism, or aggregation hardware;

calculate a risk score for the customer deployment using the fault information and using a separate risk score for the at least one shared infrastructure, wherein the risk score for the customer deployment is based at least in part on a current load of the plurality of servers and a projected load of the plurality of servers;

send the risk score to a destination associated with the first request;

receive, to the one or more APIs, a second request to modify the customer deployment including a request to reduce a probability of fault for at least one fault criterion;

in response to the request to reduce the probability of fault for at least one fault criterion, determine a plurality of deployment options and a plurality of fault scores associated with the deployment options;

automatically select a deployment option of the plurality of deployment options, wherein selecting the deployment option includes determining that the deployment option satisfies the request to reduce the probability of fault for at least one fault criterion according to at least one redeployment criterion; and modify the customer deployment according to the selected deployment option.

2. The system of claim 1, wherein the instructions when executed further cause the system to:

receive, from the customer, a set of techniques permitted to be used to modify the deployment; and determine the redeployment of at least one virtual machine to be modified in accordance with the set of techniques.

3. The system of claim 1, wherein the instructions when executed further cause the system to:

calculate a static risk score for the customer deployment, the static risk score calculated using data for a determined deployment of the virtual machines;

calculate a dynamic risk score for the customer deployment, the dynamic risk score calculated using data for at least one of the customer workload or the intended customer use for the customer deployment; and calculate the risk score based on a combination of the static risk score and the dynamic risk score.

4. A computer-implemented method, comprising:

under control of one or more computing systems including at least one processor and configured with instructions executable by the at least one processor, receiving a request for fault information for a customer deployment in a multi-tenant environment, the customer deployment including a set of resource instances allocated for use by the customer;

determining deployment data including locations and at least one shared infrastructure of the set of resource instances in the multi-tenant environment, wherein the shared infrastructure includes at least one of a power supply, a cooling mechanism, or aggregation hardware;

determining fault information for the customer deployment based at least in part upon the deployment data for the customer deployment;

determining a first risk score for the customer deployment using the fault information and using a separate risk score for the at least one shared infrastructure wherein the risk score for the customer deployment is based at least in part on a current load of one or more servers hosting the customer deployment and a projected load of one or more servers hosting the customer deployment;

in response to determining the risk score, determining a plurality of deployment options and a plurality of second risk scores associated with the deployment options;

automatically selecting a deployment option of the plurality of deployment options, wherein selecting the deployment option includes determining that the deployment option satisfies a request to reduce the risk score according to at least one redeployment criterion;

modifying the customer deployment according to the selected deployment option; and sending the fault information and the risk score for the customer deployment to the customer.

5. The computer-implemented method of claim 4 wherein the first risk score indicates an overall risk for the customer deployment based upon identified sources of risk from the locations and the at least one shared infrastructure.

6. The computer-implemented method of claim 5, further comprising:

calculating a static risk score component of the first risk score based on the identified sources of risk from the locations and the at least one shared infrastructure, the static risk score being a weighted combination of risk contributions of the identified sources of risk.

7. The computer-implemented method of claim 5, further comprising:

calculating a dynamic risk score component of the first risk score based upon at least one of customer workload data, intended use data for the customer deployment, timing for execution of the customer workload, or historical risk data for similar customer deployments.

8. The computer-implemented method of claim 7, further comprising:

aggregating risk data collected for a plurality of customer deployments; and analyzing the aggregated risk data using at least one machine learning algorithm to determine the historical risk data for similar customer deployments.

9. The computer-implemented method of claim 4, wherein the deployment data includes at least one of shared geographical regions, shared power sources, shared servers, shared hardware, shared storage, shared network switches, shared top of rack switches, fault boundaries, software age or version, hardware age or version, and shared cooling resources for resource instances of the set.

10. The computer-implemented method of claim 4, wherein the fault information is provided from an entity separate from a provider of the multi-tenant environment.

11. A non-transitory computer-readable storage medium including instructions that, when executed by at least one processor of a computing device, cause the computing device to:

receive a request for fault information for a customer deployment in a multi-tenant environment, the customer deployment including a set of resource instances allocated for use by the customer;

determine deployment data including locations and at least one shared infrastructure of the set of resource instances in the multi-tenant environment, wherein the shared infrastructure includes at least one of a power supply, a cooling mechanism, or aggregation hardware;

determine fault information for the customer deployment based at least in part upon the deployment data for the customer deployment;

determine a risk score for the customer deployment using the fault information and using a separate risk score for the at least one shared infrastructure wherein the risk score for the customer deployment is based at least in part on a current load of one or more servers hosting the customer deployment and a projected load of one or more servers hosting the customer deployment;

in response to determining the risk score, determine a plurality of deployment options and a plurality of second risk scores associated with the deployment options;

automatically select a deployment option of the plurality of deployment options, wherein selecting the deployment option includes determining that the best deployment option satisfies a request to reduce the risk score according to at least one redeployment criterion;

modify the customer deployment according to the selected deployment option; and send the fault information and the risk score for the customer deployment to the customer.

12. The non-transitory computer-readable storage medium of claim 11, wherein the first risk score indicates an overall risk for the customer deployment based upon identified sources of risk from the locations and the at least one shared infrastructure.

13. The non-transitory computer-readable storage medium of claim 12, wherein the instructions when executed further cause the computing device to:

calculating a static risk score component of the first risk score based on the identified sources of risk from the locations and the at least one shared infrastructure, the static risk score being a weighted combination of risk contributions of the identified sources of risk.

14. The non-transitory computer-readable storage medium of claim 12, wherein the instructions when executed further cause the computing device to:

calculating a dynamic risk score component of the first risk score based upon at least one of customer workload data, intended use data for the customer deployment, timing for execution of the customer workload, or historical risk data for similar customer deployments.

15. The non-transitory computer-readable storage medium of claim 14, wherein the instructions when executed further cause the computing device to:

aggregating risk data collected for a plurality of customer deployments; and analyzing the aggregated risk data using at least one machine learning algorithm to determine the historical risk data for similar customer deployments.

16. The non-transitory computer-readable storage medium of claim 11, wherein the deployment data includes at least one of shared geographical regions, shared power sources, shared servers, shared hardware, shared storage, shared network switches, shared top of rack switches, fault boundaries, software age or version, hardware age or version, and shared cooling resources for resource instances of the set.

17. The non-transitory computer-readable storage medium of claim 11, wherein the fault information is provided from an entity separate from a provider of the multi-tenant environment.

* * * * *

UNITED STATES PATENT AND TRADEMARK OFFICE
CERTIFICATE OF CORRECTION

PATENT NO. : 10,929,797 B1
APPLICATION NO. : 14/863340
DATED : February 23, 2021
INVENTOR(S) : Diwakar Gupta, Georgios Elissaios and Joshua Dawie Mentz Page 1 of 1

It is certified that error appears in the above-identified patent and that said Letters Patent is hereby corrected as shown below:

On the Title Page

Item (72) Inventors:
Update country code for Joshua Dawie Mentz from (SA) to (ZA)

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*